United States Patent
Campbell et al.

(10) Patent No.: US 9,267,434 B2
(45) Date of Patent: Feb. 23, 2016

(54) HEAT EXCHANGER

(75) Inventors: Xiaojun Campbell, East Hampton, CT (US); Thomas G. Phillips, Coventry, CT (US); Kathleen R. Phillips, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 809 days.

(21) Appl. No.: 13/360,745

(22) Filed: Jan. 29, 2012

(65) Prior Publication Data

US 2013/0192254 A1    Aug. 1, 2013

(51) Int. Cl.
| | |
|---|---|
| F02C 6/08 | (2006.01) |
| F02K 3/115 | (2006.01) |
| F02C 7/18 | (2006.01) |
| F02C 7/16 | (2006.01) |
| F02C 6/06 | (2006.01) |

(52) U.S. Cl.
CPC . *F02C 6/08* (2013.01); *F02C 7/185* (2013.01); *F02K 3/115* (2013.01); *F02C 6/06* (2013.01); *F02C 7/16* (2013.01); *F05D 2260/20* (2013.01); *Y02T 50/675* (2013.01)

(58) Field of Classification Search
CPC ......... F02K 3/115; Y02T 50/675; F02C 6/06; F02C 7/16
USPC .............. 60/226.1, 262, 266, 728, 785, 795
See application file for complete search history.

(56) References Cited

U.S. PATENT DOCUMENTS

| | | | |
|---|---|---|---|
| 4,254,618 A | | 3/1981 | Elovic |
| 4,474,001 A | * | 10/1984 | Griffin et al. ................... 60/204 |
| 4,546,605 A | * | 10/1985 | Mortimer et al. ............ 60/226.1 |
| 5,048,288 A | * | 9/1991 | Bessette et al. .............. 60/226.1 |
| 5,269,133 A | | 12/1993 | Wallace |
| 5,269,135 A | * | 12/1993 | Vermejan et al. ............. 60/226.1 |
| 5,297,386 A | * | 3/1994 | Kervistin ..................... 60/226.1 |
| 5,351,473 A | * | 10/1994 | Shuba ............................. 60/782 |
| 6,058,696 A | * | 5/2000 | Nikkanen et al. ............ 60/226.1 |
| 6,584,778 B1 | | 7/2003 | Griffiths et al. |
| 7,454,894 B2 | * | 11/2008 | Larkin et al. ................. 60/226.1 |
| 7,607,308 B2 | | 10/2009 | Kraft et al. |

(Continued)

FOREIGN PATENT DOCUMENTS

WO    2011139317 A2    11/2011

OTHER PUBLICATIONS

International Search Report and Written Opinion, PCT/US2013/023577 completed May 13, 2013.

(Continued)

*Primary Examiner* — Phutthiwat Wongwian
*Assistant Examiner* — Michael B Mantyla
(74) *Attorney, Agent, or Firm* — Carlson, Gaskey & Olds, PC

(57) ABSTRACT

A gas turbine engine has a fan, a compressor section, a combustor, and a turbine section. The fan delivers a portion of air into the compressor, and into a duct, as bypass air. A bleed air system bleeds a quantity of air from the compressor into a chamber at least at low power conditions of the engine. The bleed air system has an opening which may be selectively closed to block bleed air, or opened to allow bleed flow from the compressor into the chamber. A heat exchanger is positioned such that a first surface of the heat exchanger is contacted by bypass air in the duct, and a second surface of the heat exchanger is contacted by bleed air when the bleed air system directs air from the compressor into the chamber.

8 Claims, 2 Drawing Sheets

(56) References Cited

U.S. PATENT DOCUMENTS

| | | | |
|---|---|---|---|
| 7,694,505 B2 | 4/2010 | Schilling | |
| 7,862,293 B2 | 1/2011 | Olver | |
| 7,966,831 B2 | 6/2011 | Kraft et al. | |
| 8,387,362 B2 * | 3/2013 | Storage et al. | 60/266 |
| 8,601,791 B2 * | 12/2013 | Bajusz et al. | 60/267 |
| 8,784,047 B2 * | 7/2014 | Elder | 415/178 |
| 8,876,465 B2 * | 11/2014 | Stretton | 415/116 |
| 9,045,998 B2 * | 6/2015 | Lo | F01D 17/105 |
| 9,051,943 B2 * | 6/2015 | Elder | F02K 3/115 |
| 9,175,695 B2 * | 11/2015 | Bulin | F04D 29/584 |
| 2005/0150970 A1 | 7/2005 | Beutin et al. | |
| 2008/0053060 A1 | 3/2008 | Olver | |
| 2008/0230651 A1 | 9/2008 | Porte | |
| 2010/0139288 A1 * | 6/2010 | Rago | 60/785 |
| 2010/0180571 A1 | 7/2010 | Zysman et al. | |
| 2011/0088405 A1 | 4/2011 | Turco | |
| 2015/0052907 A1 * | 2/2015 | Murphy | F01D 17/085 60/783 |

OTHER PUBLICATIONS

Jane's Aero-Engines, Issue Seven, Copyright 2000, pp. 510-512.
International Preliminary Report on Patentability for International Application No. PCT/US2013/023577 mailed on Aug. 7, 2014.
Supplementary European Search Report for European Application No. 13741305.0 completed Nov. 9, 2015.

* cited by examiner

HEAT EXCHANGER

BACKGROUND

This application relates to a cooler for use in a gas turbine engine.

Gas turbine engines are known, and typically include a fan delivering air into a compressor. The air is compressed and passed into a combustion section. From the combustion section, the air is mixed with fuel and ignited, and then passes over turbine rotors.

A number of accessories are associated with gas turbine engines. As an example, a generator generates electricity. Various fluid supply systems such as oil supply, fuel supply, etc. deliver fluids around the gas turbine engine. Many of these accessories require some degree of cooling and may receive lubricant, which also requires cooling. Thus, there are a number of heat exchangers in a gas turbine engine.

Typically, so-called air-to-fluid heat exchangers have been placed in a location where a single source of air will pass over the heat exchanger.

As one example, a heat exchanger may be placed in a bypass air duct, such that cooling air being driven by the fan will pass across the heat exchanger.

Alternatively, heat exchangers have been placed in other locations where air may be driven through the gas turbine engine.

The current known location for such heat exchangers have resulted in unduly large heat exchangers.

SUMMARY

In a featured embodiment, a gas turbine engine has a fan, a compressor section, a combustor, and a turbine section. The fan delivers a portion of air into the compressor, and a portion of air into a duct, as bypass air. A bleed air system bleeds a quantity of air from the compressor into a chamber at least at low power conditions of the engine. The bleed air system has an opening that may be selectively closed to block bleed air, or opened to allow bleed flow from the compressor to the chamber. A heat exchanger has fluid containing passages to be cooled. The heat exchanger is positioned such that a first surface is contacted by bypass air in the duct, and a second surface is contacted by bleed air when the system is directing air from the compressor into the chamber.

In a further embodiment according to the previous embodiment, fins are formed on the first surface of the heat exchanger extending into the bypass air flow.

In a further embodiment according to the previous embodiment, fins are also formed on the second surface of the heat exchanger and extend toward the bleed air flow.

In a further embodiment according to the previous embodiment, the fins on the second surface extend for a greater height away from the fluid containing passages than do the fins on the first surface.

In a further embodiment according to the previous embodiment, the fins on the first surface extend for a greater length along a flow path of the bypass air than do the fins on the second surface.

In a further embodiment according to the previous embodiment, the heat exchanger selectively cools a fluid associated with a generator for the gas turbine engine.

In another featured embodiment, a gas turbine engine has a heat exchanger with a first convective cooling feature and a second convective cooling feature. The first convective cooling feature is disposed at least partially in fluid communication with a bypass air flow of the engine, wherein the second convective cooling feature is disposed at least partially in a bleed air chamber of the engine.

In a further embodiment according to the previous embodiment, a selectively controllable valve controls bleed air flow from a compressor of the engine to the bleed air chamber.

These and other features may be best understood from the following drawings and specification.

DETAILED DESCRIPTION

Figure 1:
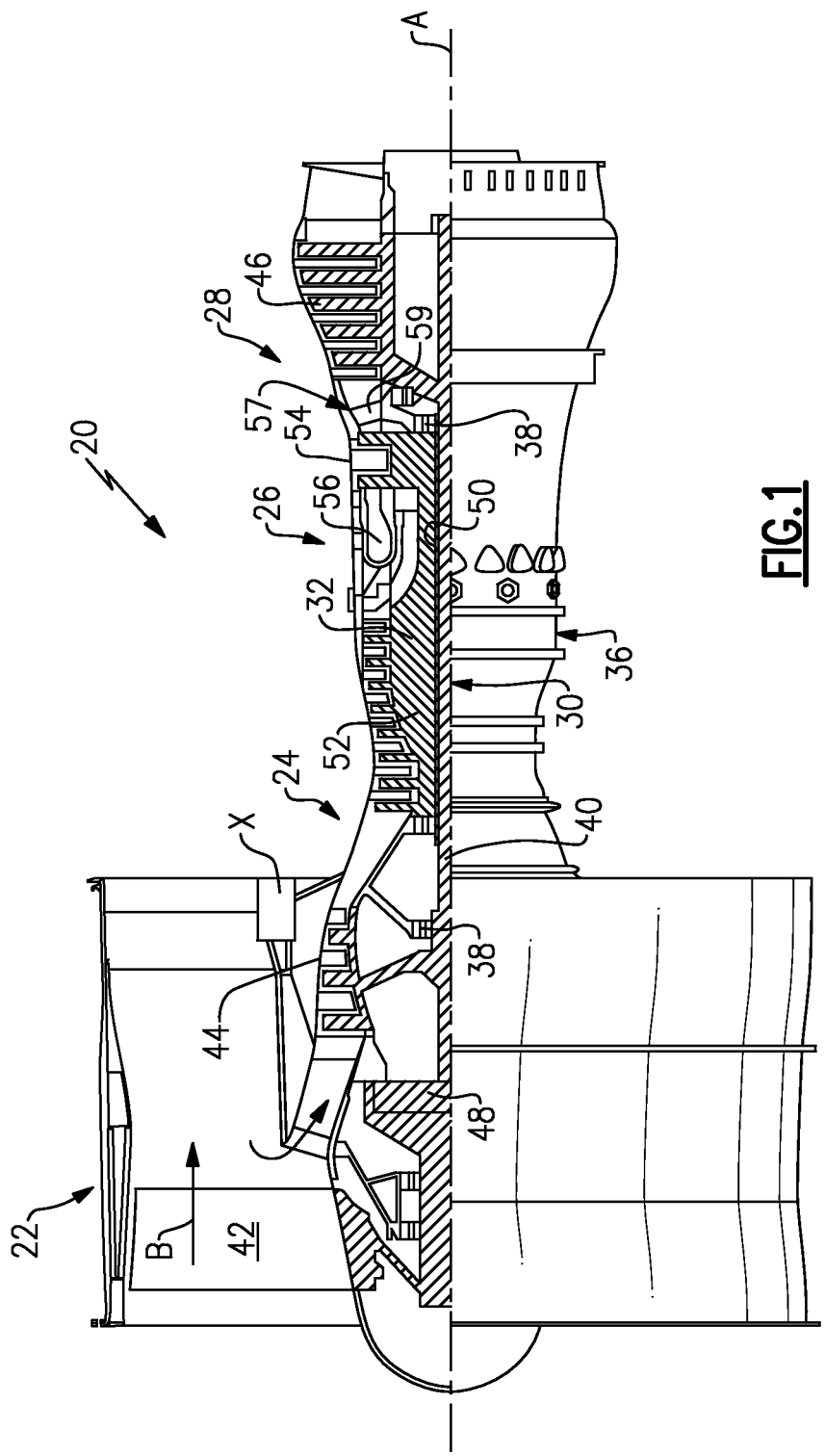
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than a ratio of approximately 10:1, the geared architecture 48 is an epicyclic gear train, such as a planetary gear system or other gear system, with a gear reduction ratio of greater than about 2.3:1 and the low pressure turbine 46 has a pressure ratio that is greater than about 5:1. In one disclosed embodiment, the engine 20 bypass ratio is greater than about 10:1, the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point.

To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

This application relates to a heat exchanger in such a gas turbine engine which utilizes cooling air from two distinct sources such that the heat exchanger may be made smaller than the prior art.

Figure 2:
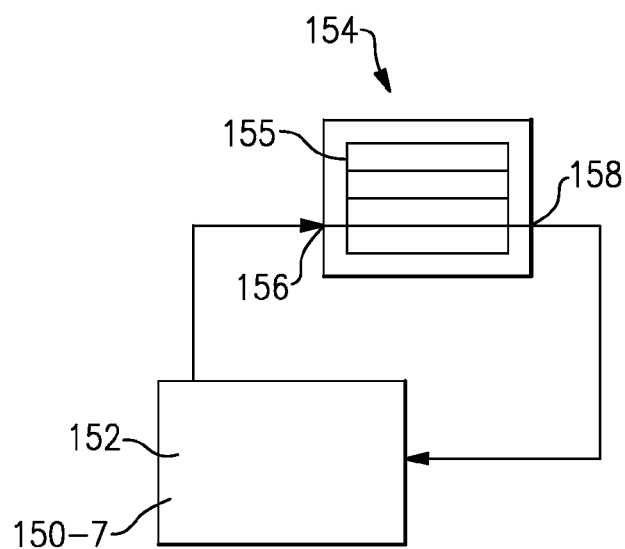
FIG. 2 schematically shows an oil cooling system for an accessory in a gas turbine engine.

FIG. 2 shows a circuit for cooling oil such as may be associated with an accessory 152. In one example, accessory 152 may be a generator. Hot oil leaves the generator 152 after cooling the generator, and enters an inlet 156 associated with a heat exchanger 154. The oil passes through a series of passages 155 from the inlet manifold, to an outlet manifold, and then the outlet 158 of the heat exchanger. This oil is then returned to the generator 152, having been cooled by air.

Figure 3:
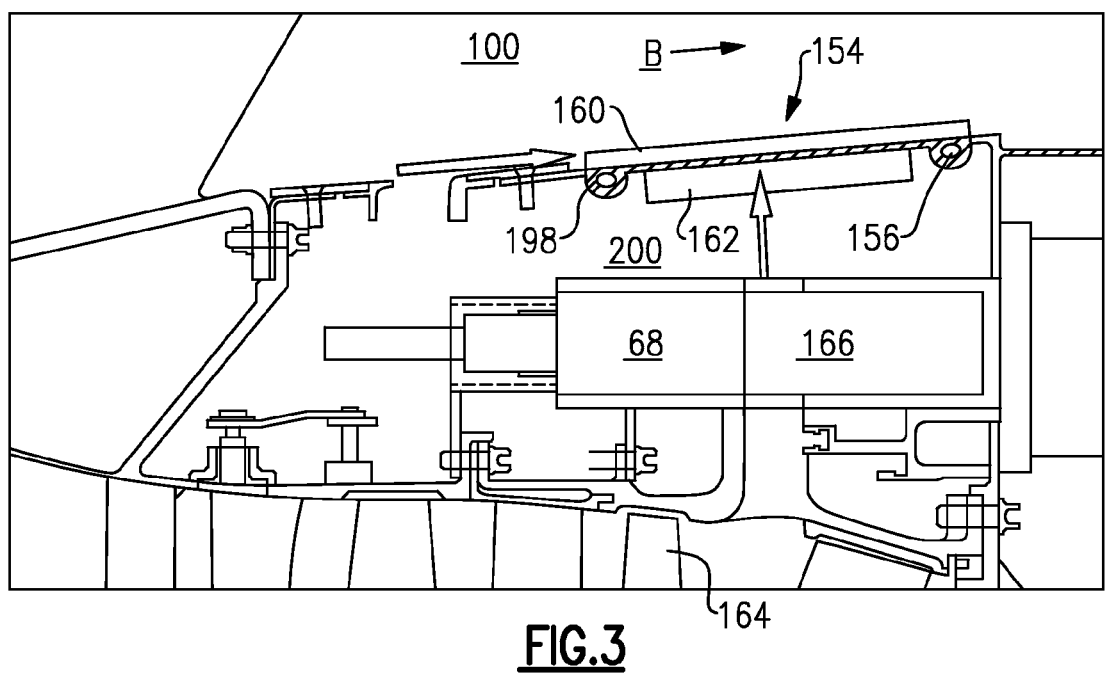
FIG. 3 shows the location of a heat exchanger.

FIG. 3 shows a location for the heat exchanger 154. The location may be approximately at area X as shown in FIG. 1. As shown, the heat exchanger 154 is located such that one side has convective cooling features 160 that are disposed at least partially within the duct 100 that is in fluid communication with bypass airflow B (see FIG. 1). The convective cooling features 160 may be fins, pins, projections, ribs, etc. The features 160 provide surface area for convective cooling. These features 160 may be relatively small, as they will extend into the bypass air flow, and it may be desirable to limit obstruction to this flow. The size and geometry of the features 160 may be optimized to consider both the weight of the heat exchanger, drag within the bypass air flow, and convective cooling magnitude.

The opposed side of the heat exchanger 154 has features 162 which tend are disposed at least partially within a bleed air supply chamber 200.

As known, under bleed conditions, bleed air is air downstream of a compressor rotor 164 (which may be part of the low pressure compressor 44, see FIG. 1) that is diverted out of the core engine flow and into the chamber 200. This typically occurs at low power conditions, and serve to reduce the load of downstream compressor stages, and the rest of the engine by not driving unnecessary air through the engine. This may occur while the aircraft is idling on the ground, as an example.

The heat exchanger 154 is located such that the features 162 are in fluid communication with the bleed air flow. The size and geometry of the features 162 may be optimized to consider both the weight of the heat exchanger, drag within the bleed air flow, and convective cooling magnitude. These low pressure conditions are also coincidentally a most challenging time for the heat exchanger 154 to be adequately cooled by the bypass air alone in duct 100. As an example, there may be a limited amount of bypass air under those conditions. In the past, the heat exchangers cooled by bypass air have been necessarily unduly large, as they must still adequately cool the fluid even under the low power conditions.

The features 160 extend away from a surface of the heat exchanger 154 for a lesser distance than the features 162 extend away from the opposed surface. This is because the features 160 extend into the bypass air flow, and as mentioned above, it would be desirable to limit their height.

On the other hand, the features 160 may extend for a greater distance along a flow path of the bypass air B than do the features 162. This is generally as illustrated in FIG. 3.

In one embodiment, the features 160 extend away from a surface of the heat exchanger for 0.40" (1.02 cm), and extend along the path of the bypass air flow B for 6" (15.2 cm). In this same embodiment, the features 162 extend away from the surface for 0.5" (1.27 cm), and extend along the flow path for 4" (10.2 cm).

As is known, a mechanism 68 can selectively close off the passage 166 and block further bleed air flow. Examples of mechanisms include valves and gates that may be mechanically and/or electromechanically controlled. This occurs as the engine moves more toward full power operation. However, under those conditions, the bypass airflow will be greatly increased in volume, and should adequately cool the fluid in the heat exchanger 154 on its own.

Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a fan, a compressor section, a combustor, and a turbine section, said fan delivering a portion of air into said compressor, and said fan delivering a portion of air into a duct, as bypass air;
   a bleed air system for bleeding a quantity of air from the compressor into a chamber at least low power conditions of the gas turbine engine, said bleed air system having an opening which may be selectively closed to block bleed air, or opened to allow bleed air from the compressor to the chamber;

a heat exchanger having fluid containing passages to be cooled and a heat exchanger wall, said heat exchanger positioned such that a radially outer surface of said heat exchanger wall is contacted by bypass air in the duct, and a radially inner surface of said heat exchanger wall is contacted by bleed air when said bleed air system is directing air from the compressor into the chamber, wherein said heat exchanger wall separates the bypass air from the bleed air;

and said heat exchanger fluid containing passages communicating with a lubricating fluid from an accessory on said gas turbine engine.

2. The gas turbine engine as set forth in claim 1, wherein fins are formed on said radially outer surface of said heat exchanger wall extending into the bypass air.

3. The gas turbine engine as set forth in claim 2, wherein fins are also formed on said radially inner surface of said heat exchanger wall and extend toward the bleed air.

4. The gas turbine engine as set forth in claim 3, wherein said fins on said radially inner surface extend for a greater height away from the fluid containing passages than do said fins on said radially outer surface.

5. The gas turbine engine as set forth in claim 4, wherein said fins on said radially outer surface extend for a greater length along a flow path of the bypass air than do the fins on said radially inner surface.

6. The gas turbine engine of claim 1, wherein said accessory is a generator, and said lubricating fluid is oil from said generator.

7. A gas turbine engine comprising:
a fan duct having a bypass air flow;
a bleed air system for bleeding a bleed air flow from a compressor section into a bleed air chamber, wherein the bleed air flow is selectively bled from the compressor section into the bleed air chamber;
a heat exchanger having a first convective cooling feature and a second convective cooling feature on a heat exchanger wall, wherein the first convective cooling feature is disposed on a radially outer side of the heat exchanger wall and at least partially in fluid communication with the bypass air flow of the gas turbine engine, wherein the second convective cooling feature is disposed on a radially inner side of the heat exchanger wall and at least partially in the bleed air chamber of the gas turbine engine and at least partially in fluid communication with the bleed air flow, wherein said heat exchanger wall separates the bypass air flow from the bleed air flow;
and said heat exchanger selectively cooling a lubricating fluid associated with a generator.

8. The gas turbine engine of claim 7, further comprising a selectively controllable valve that controls the bleed air flow from the compressor section of the gas turbine engine to the bleed air chamber.

* * * * *